(12) United States Patent
Gilb

(10) Patent No.: US 8,831,225 B2
(45) Date of Patent: Sep. 9, 2014

(54) SECURITY MECHANISM FOR WIRELESS VIDEO AREA NETWORKS

(75) Inventor: James P. K. Gilb, San Diego, CA (US)

(73) Assignee: Silicon Image, Inc., Sunnyvale, CA (US)

(*) Notice: Subject to any disclaimer, the term of this patent is extended or adjusted under 35 U.S.C. 154(b) by 1633 days.

(21) Appl. No.: 12/079,133

(22) Filed: Mar. 25, 2008

(65) Prior Publication Data

US 2009/0010438 A1 Jan. 8, 2009

Related U.S. Application Data

(60) Provisional application No. 60/920,356, filed on Mar. 26, 2007.

(51) Int. Cl.
 *H04L 9/00* (2006.01)
 *H04L 29/06* (2006.01)
 *H04W 12/08* (2009.01)

(52) U.S. Cl.
 CPC ........... *H04L 63/104* (2013.01); *H04L 63/0823* (2013.01); *H04L 63/065* (2013.01); *H04W 12/08* (2013.01)
 USPC ........................................................ 380/277

(58) Field of Classification Search
 CPC .............. H04N 1/00; H04N 21/43637; H04N 21/2541; H04N 21/4627; H04W 12/04; H04W 12/06; H04W 12/08
 USPC ........................................................ 380/277
 See application file for complete search history.

(56) References Cited

U.S. PATENT DOCUMENTS

| | | | |
|---|---|---|---|
| 2006/0114941 A1* | 6/2006 | Silverman et al. ............ | 370/503 |
| 2006/0177066 A1 | 8/2006 | Han et al. | |
| 2007/0106894 A1 | 5/2007 | Zhang et al. | |
| 2007/0286130 A1* | 12/2007 | Shao et al. .................... | 370/336 |
| 2008/0133414 A1* | 6/2008 | Qin et al. ........................ | 705/50 |
| 2008/0134309 A1* | 6/2008 | Qin et al. ........................... | 726/6 |
| 2008/0247371 A1* | 10/2008 | Kwon et al. .................. | 370/338 |
| 2009/0257403 A1* | 10/2009 | Jeon et al. ..................... | 370/331 |

FOREIGN PATENT DOCUMENTS

| | | |
|---|---|---|
| WO | WO 2005/088896 | 9/2005 |
| WO | WO 2005/101727 | 10/2005 |
| WO | WO 2008/069534 | 6/2008 |

OTHER PUBLICATIONS

Lianne Caetano. 60 GHz Architecture for Wireless Video Display. Mar. 2006. SiBeam White Papers.*
Gilbert et al. Wireless Panel Architecture using Lossless Uncompressed 60 GHz Transmissions. SiBeam Inc.*
PCT International Preliminary Report on Patentability for corresponding PCT Patent Application No. PCT/US2008/003977, Oct. 8, 2009, 9 pgs.
International Search Report and Written Opinion of the International Searching Authority dated Sep. 2, 2008 for PCT/US08/003977, filed Mar. 26, 2008.

* cited by examiner

*Primary Examiner* — Tamara T Kyle
(74) *Attorney, Agent, or Firm* — Fenwick & West LLP

(57) ABSTRACT

A device is disclosed including a security module to generate and update cryptographic keys to establish a secure relationship between the device and one or more station devices in a wireless video area network (WVAN) and a domain manager to maintain a list of the station devices that are authorized to operate in the WVAN.

22 Claims, 3 Drawing Sheets

SECURITY MECHANISM FOR WIRELESS VIDEO AREA NETWORKS

This is a non provisional application based on the provisional application Ser. No. 60/920,356 filed Mar. 26, 2007, and claims priority thereof.

FIELD OF INVENTION

An embodiment of the invention relates to wireless communication, and more specifically, to securing the transfer of multimedia data via wireless communication networks.

BACKGROUND

WirelessHD is a wireless video area network (WVAN) specification that provides an interface for wireless high-definition transmission of HD video and audio signals for consumer electronics products. Devices implementing the WirelessHD specification typically include antenna technology that enables line of sight (LOS) and non line of sight (NLOS) communication with other devices, where NLOS is a radio channel or link having no visual LOS between an antenna of a transmitting device and an antenna of a receiving device.

However, a problem may exist in WVAN networks in that data wirelessly transmitted between devices may not be secure. Moreover, unauthorized devices may be introduced into the network that may be used to acquire private user data.

Accordingly, what is desired is a mechanism to provide privacy for user owned data in a WVAN network.

SUMMARY

According to one embodiment, a device is disclosed having a security module to generate and update cryptographic keys to establish a secure relationship between the device and one or more station devices in a wireless video area network (WVAN) and a domain manager to maintain a list of the station devices that are authorized to operate in the WVAN.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
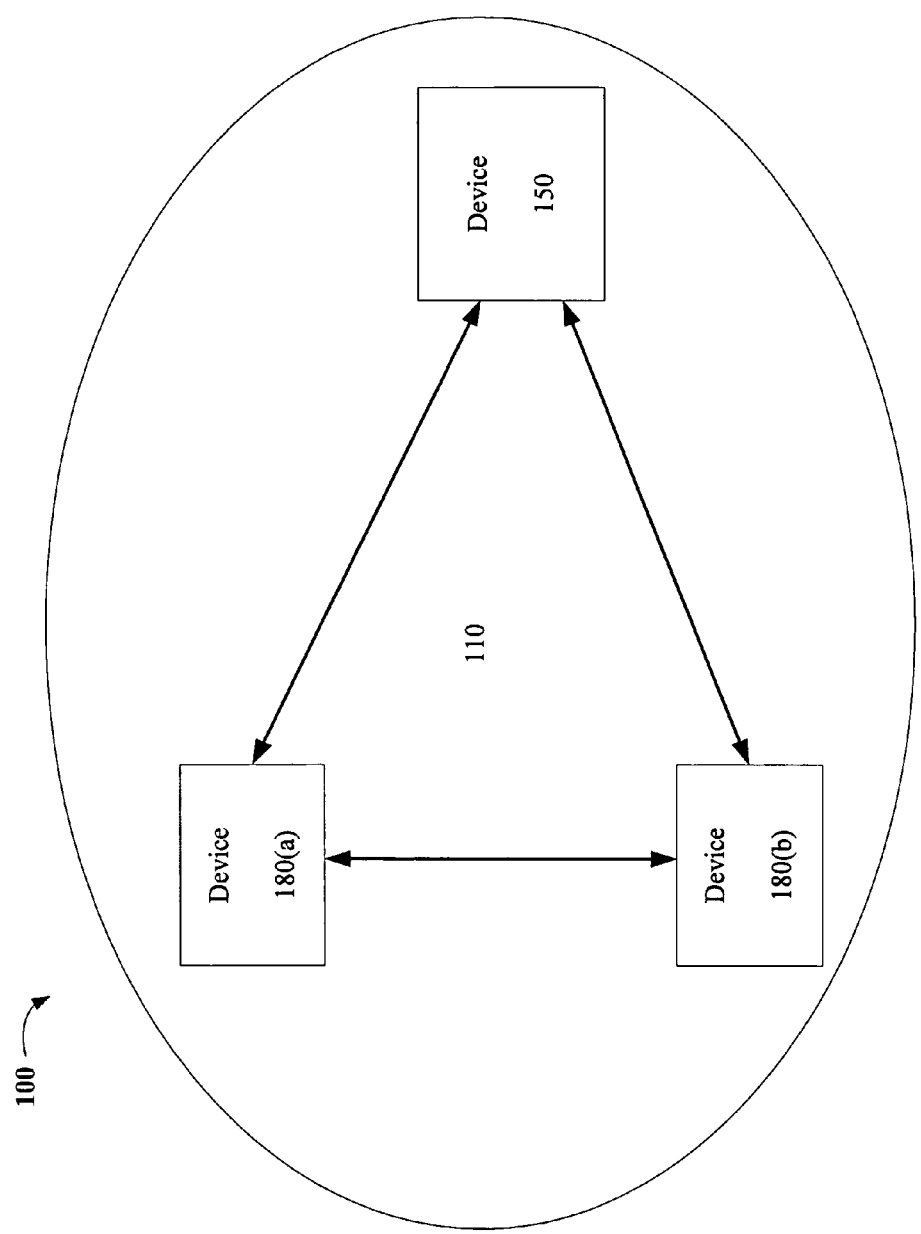
FIG. 1 is a block diagram of one embodiment of a communication system.

A security mechanism for a multiple wireless networks is disclosed. According to one an embodiment, the security mechanism includes a station device transmitting a request to a domain manager to be authorized to join a wireless video area network (WVAN). Upon receipt, the domain manager verifies that a public key of the station device is a valid key and requests that a user confirm authorization of the station device.

Upon verification, the domain manager transmits an authorization command to the station device indicating that the station device is authorized to join the WVAN. In response to receiving the authorization command, the station device verifies that a public key of the domain manager is a valid key and requests that the user confirm authorization of the domain manager. Once the user confirms authorization, the station device verifies an authentication token of the station device with the public key of the domain manager and stores the authentication token of the station device and the public key of the domain manager if the verification is successful.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a block diagram of one embodiment of a communication system 100. Referring to FIG. 1, communication system 100 includes a network 110 of devices. In one embodiment, network 110 is a wireless network, such as a WirelessHD. However, in other embodiments, different types of wireless networks (e.g., WVAN or WPAN) may be implemented.

In a further embodiment, devices operating in network 110 may communicate in either an NLOS protocol or an LOS protocol. In yet another embodiment, devices in network 110 operate on the 60 GHz band. However, in other embodiments, network 110 may operate at other frequency bands (e.g., 2.4 GHz band).

According to one embodiment, network 110 includes a device 150, as well as devices 180 (e.g., 180(a) and 180(b)). In a further embodiment, device 150 is a coordinator device, while devices 180 are station devices. A coordinator device controls access to, and manages the timing, of network 110. Further, a coordinator device has the capability of operating as a station device.

Coordinator device 150 may be a sink for audio and video data. In such an embodiment, device 150 is a flat panel television that is capable of displaying audio/video content received from devices 180. However in other embodiments, coordinator device 150 may be implemented as other types of devices (e.g., personal video recorder (PVR), a set top box, etc).

According to one embodiment, station devices 180 are devices that participate in network 110 as either source or destination (or sink) of audio/video data streams. In a further embodiment, devices 180 may source and sink data simultaneously. For instance, device 180(a) may include a DVD player device and 180(b) a PVR that receives data from device 180(a) for recording while simultaneously transmitting data to device 150 for display. Although, devices 180 may, in other embodiments, be implemented as other types of devices. Further, additional devices 180 (e.g., 180(c), 180(d)-180(n)) may be included in network 110.

Figure 2:
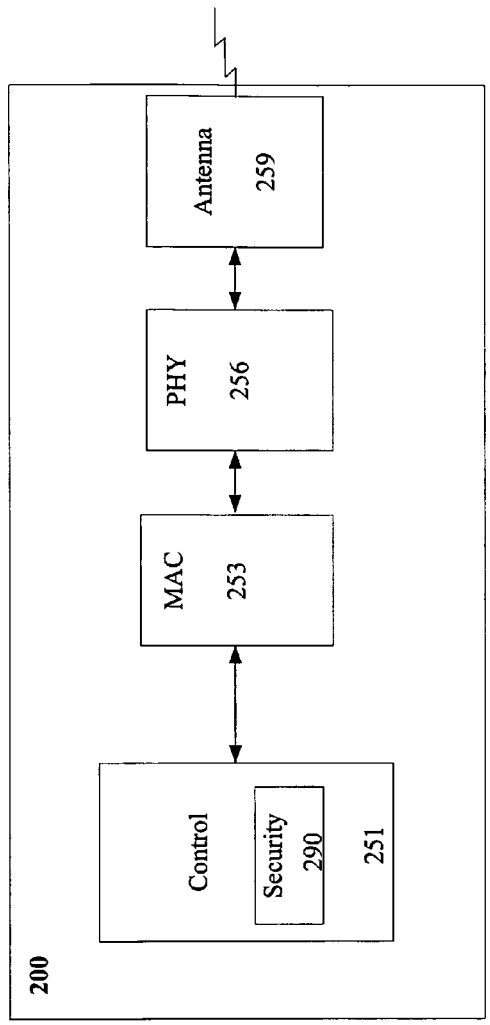
FIG. 2 is a block diagram of one embodiment of a device.

FIG. 2 is a block diagram of one embodiment of a device 200, representative of coordinator device 150 and station devices 180. According to one embodiment, device 200 includes control module 251, media access control (MAC) 252 253, physical layer (PHY) 256 and antenna 259 that are implemented to enable the wireless transfer of data between devices 150 and 180 in network 110.

Control module 251 controls the wireless transfer of data to other devices. Particularly, control module 251 performs functions such as authentication and key generation for content protection, video format selection (e.g., resolution, color, depth, etc.), video and audio encode and decode, clock synchronization and service discovery.

MAC 253 performs functions such as PHY channel selections; send/receive data, connection start/stop, bandwidth reservation, device discovery, shutdown/sleep, and authentication. In one embodiment, MAC 253 also performs scheduling of beamforming. PHY 256 passes channel assessment to MAC 252, send/receive data, perform antenna control, verify header information, etc.

As discussed above, control module 251 controls the transfer of data to other devices within network 110. According to one embodiment, control module 251 includes a security module 290 to ensure that the privacy of data owned by a user of network 110. In one embodiment, security module 290 performs authentication and key establishment. Thus, the identity of devices in a data transfer is mutually assured using public-key cryptography and a secret key is established between the devices. Further, security module 290 performs beacon protection where the beacon contents of antenna 259 are cryptographically authenticated.

According to one embodiment, security module 290 also performs command protection, where each command is encrypted and its contents are cryptographically authenticated. Security module 290 also handles key distribution, which includes a secure method for updating the data between devices, and freshness protection that includes a strictly increasing secure packet counter used to prevent the replay of old messages.

Finally, security module 290 performs data integrity and data privacy. Data integrity involves cryptographically authenticating the integrity of data for both the source and content. Data privacy involves encrypting data to prevent unauthorized users from viewing the data when transmitted. According to one embodiment, data privacy is achieved using a four-pass public key exchange, an encryption algorithm and a cryptographic integrity calculation.

The public key, encryption and integrity calculations are specified by a particular security suite. In one embodiment, the RSA Encryption Scheme-Optimal Asymmetric Encryption Padding (RSA-OAEP) public key method is used in the authorization of the identity of the devices.

According to one embodiment, a secure network 110 is one in which a coordinator device mandates that all station devices that join network 110 successfully authenticate with the coordinator device. In addition, all station devices in network 110 have a common symmetric group key that is used for encryption and data integrity. Thus, all station devices support security for user data privacy.

Figure 3:
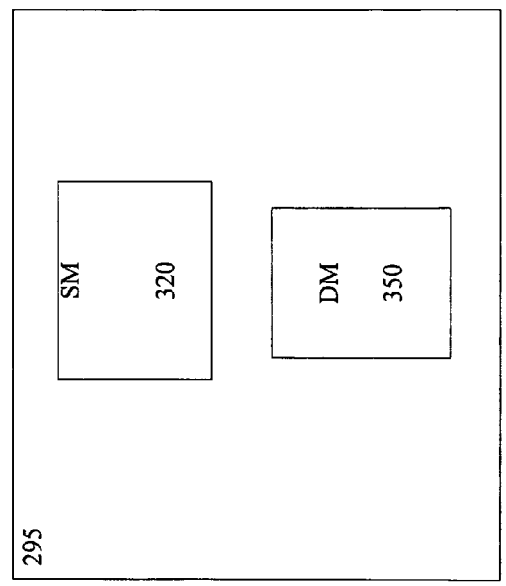
FIG. 3 is a diagram illustrating one embodiment of a security module.

FIG. 3 illustrates one embodiment of security module 290. Security module 290 includes a security manager (SM) 320 and a domain manager (DM) 350. According to one embodiment, SM 320 generates and updates the cryptographic keys that create a secure relationship between devices. DM 350 maintains a list of devices that are authorized to operate in network 110. The SM 320 permits authorized devices to join the network.

In a further embodiment, only one device in network 110 may operate as the acting DM and the SM, or both, at any particular time. However, each station device in network 110 supports acting as the DM 350 and acting as the SM 320. In such an embodiment, the SM 320 of the coordinator device is to operate as the SM. In other embodiments, the coordinator device may designate a station device to operate as SM whenever the coordinator enters a sleep mode, or is otherwise not participating in network 110.

According to one embodiment, the network 110 user selects which DM 350 at a device is to serve as the DM to authorize all station devices in the secure network 110. In a further embodiment, DM 350 performs an authorization protocol to establish that a public key belongs to a device that it is trusted. The authentication protocol may involve user intervention as a trusted party in the relationship. Authorization includes domain authorization (DA) and access control list (ACL), both supported by each device in network 110. Each authorization method involves DM 350 of a single device in network 110 acting as the authorizing entity, where the DM 350 selects the authorization method that it will use as the DM.

In one embodiment, if the DM is not participating in network 110, new devices will not be able to be authorized as trusted members of the secure network 110. However, if a device has been previously authorized by the DM, the device may join the secure network 110 as a trusted member in a cryptographically secure manner, even if the DM is not participating.

According to one embodiment, the authorization methods include the signature of the DM over the public key (or the hash of the public key) of the station device. Similarly, both methods include a signed list in addition to the public key. For DA, the list is a token revocation list (TRL). The TRL is a signed list of the public keys that are no longer trusted. For the ACL method, the list is ACL, which is a signed list of the public keys that are trusted.

In a further embodiment, each authorized station in network 110 include an authentic copy of the public key of the DM, the address of the DM and the latest version of the security list (e.g., TRL or ACL). In yet a further embodiment, the security list, is signed by the DM and includes a strictly increasing sequence number that is issued by the DM and is a component of the signed data.

When a station device receives a security list from any source that is verified by the authentic copy of public key of the DM and has a higher version sequence number than the list currently maintained by the station, the station accepts that list as the current list and stores it for future authorization and authentication events. In one embodiment, stations use an Announce Request command to send the Security List to other stations and a Probe Request command to request a copy of the Security List from another station.

Figure 4:
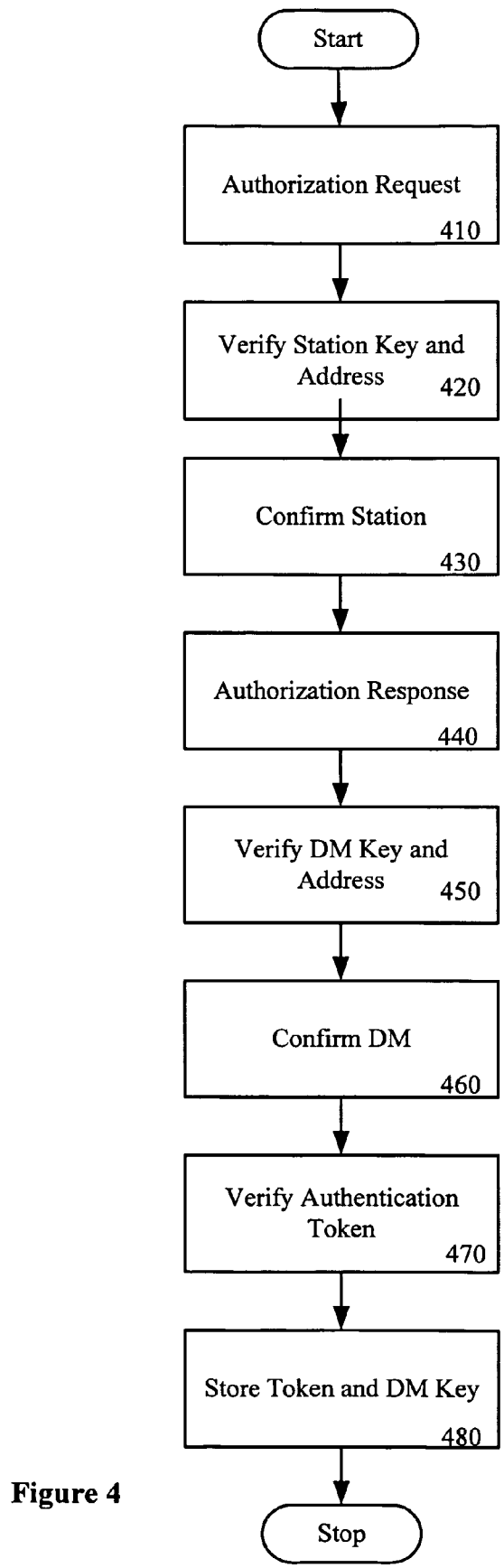
FIG. 4 is a flow diagram for one embodiment of an authorization protocol.

FIG. 4 is a flow diagram for one embodiment of an authorization protocol. At processing block 410, a station requests authorization by transmitting the Authorization Request command to the device operating as DM. At processing block 420, the DM verifies that public key of the station is a valid key for the current authentication security suite implemented and that the received address is a valid station MAC address. At processing block 430, the DM asks the network 110 user for confirmation.

In one embodiment, user interaction is requested by making a light flash on the DM device. Subsequently, the user may push a button on the DM device to confirm the authorization. However, other embodiments may include other types of mechanism to enable user confirmation. After the user's confirmation, the DM transmits the Authorization Response command to the station requesting authorization, processing block 440.

Upon receiving the Authorization Response command, the station verifies that the public key of the DM is a valid key for the current authentication security suite and that the received address is a valid DM address, processing block 450. At processing block 460, the station requests confirmation from the user. At processing block 470, the station verifies an authentication token of the station with the public key of the DM. At processing block 480, the station stores the authentication token of the station and the public key of the DM if the verification is successful.

According to one embodiment, the user may revoke the authorization of a station through the DM. Once the DM has received a request from the user to revoke authorization, the DM updates the Security List to reflect the changes. In a further embodiment, once a station's authorization has been revoked, it can be reinstated by successfully completing the authorization protocol as described above with respect to FIG. 4.

In one embodiment, an authentication token revocation list (TRL) for the DA method is created and maintained by the DM as the security list for the domain. When authorization for a station has been revoked, the station is added to the security list. If the authorization for the station is reinstated, the station is removed from the security list by the DM.

For the ACL method, an ACL is created and maintained by the DM as the security list for the domain. When authorization for a station has been revoked, the station entry is removed from the security list. If the authorization for the station is reinstated, the station entry is added to the security list.

According to one embodiment, a new version of the security list is broadcast to all the stations after each change by the DM using the Announce Request command with the security list. The station verifies the authenticity of the security list and if the version number is higher than the version number of the current stored security list, the new security list is stored and the old security list is deleted.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A device comprising:
    a security module to generate and update cryptographic keys to establish a secure relationship between the device and one or more station devices in a wireless video area network (WVAN);
    a domain manager to maintain a security list of the station devices that are authorized to operate in the WVAN, wherein the domain manager is to further sign the security list having therein a strictly increasing sequence number issued by the domain manager to indicate a version of the security list maintained by the domain manager; and
    an antenna for wireless transmitting of high-definition video and audio signals to the one or more station devices in the WVAN.

2. The device of claim 1 wherein the domain manager performs an authorization protocol to establish that a public key is a key of a trusted station device.

3. The device of claim 2:
    wherein a new station device cannot be authorized to join the WVAN when the domain manager is not participating in the WVAN; and wherein a previously authorized station device may rejoin the WVAN whether or not the domain manager is participating in the WVAN.

4. The device of claim 1, wherein the device further comprises a control module to:
(a) control the wireless transmitting from the antenna;
(b) implement content protection for the wireless transmitting of high-definition video and audio signals via the antenna; and
(c) control video format selection via one or more of video resolution, video color, and video depth.

5. The device of claim 2 wherein the authorization protocol comprises:
the signed security list specifying a list of authorized station devices; and
a hash of a public key or a signature of the domain manager applied to the public key.

6. The device of claim 5 wherein the signed security list includes a token revocation list of public keys that are no longer trusted.

7. The device of claim 5 wherein the signed security list of authorized station devices includes an access control list of public keys that are trusted.

8. A method comprising:
receiving, at a domain manager, a request from a station device to be authorized to join a wireless video area network (WVAN), wherein the domain manager, upon receipt of the request, verifies that a public key of the station device is a valid key and requests a user to confirm authorization of the station device;
maintaining, at the domain manager, a security list of the station devices that are authorized to operate in the WVAN, wherein the domain manager further signs the security list having therein a strictly increasing sequence number issued by the domain manager to indicate a version of the security list maintained by the domain manager; and
upon verification that the public key of the station device is a valid key, transmitting an authorization command from the domain manager to the station device; and
wirelessly transmitting via an antenna, high-definition video and audio signals to at least the station device in the WVAN.

9. The method of claim 8 further comprising:
verifying, at the domain manager, that a received address of the station device is a valid address.

10. The method of claim 8 further comprising:
transmitting the signed security list of authorized station devices from the domain manager to the station device after the user confirms authorization of the station device, wherein the user confirms authorization of the station device by pushing a button on a domain manager to confirm the authorization.

11. A method comprising:
transmitting a request from a station device to a domain manager, the station device requesting to be authorized to join a wireless video area network (WVAN), wherein the domain manager to maintain a security list of the station devices that are authorized to operate in the WVAN and wherein the domain manager is to further sign the security list having therein a strictly increasing sequence number issued by the domain manager to indicate a version of the security list maintained by the domain manager;
receiving an authorization command at the station device from the domain manager, the authorization command indicating the station device is authorized to join the WVAN;
verifying that a public key of the domain manager is a valid key;
requesting a user to confirm authorization of the domain manager;
verifying an authentication token of the station device with the public key of the domain manager; and
storing the authentication token of the station device and the public key of the domain manager if the verification is successful; and
wirelessly transmitting via an antenna, high-definition video and audio signals to at least the station device in the WVAN.

12. The method of claim 11 further comprising the station device verifying that a received address of the domain manager is a valid address.

13. The method of claim 11 further comprising the station device receiving the signed security list of authorized station devices from the domain manager with the authorization command.

14. The method of claim 13 further comprising:
receiving, at the station device, a second signed security list of authorized station devices from the domain manager;
determining if the version of the second signed security list is higher than the version of the first signed security list of authorized station devices; and
storing the second signed security list of authorized station devices when the version of the second signed security list is greater than the version of the first signed security list.

15. The method of claim 13 further comprising:
receiving, at the station device, a second signed security list of authorized station devices from a second station device operating as a station manager when the domain manager is not participating in the WVAN.

16. The method of claim 13 further comprising:
transmitting a second signed security list of authorized station devices from the station device to a second station device operating as a station manager when the domain manager is not participating in the WVAN.

17. A wireless video area network (WVAN) comprising:
one or more station devices; and
a coordinator device including:
a security module to generate and update cryptographic keys to establish a secure relationship between the coordinator device and the one or more station devices; and
a domain manager to maintain a security list of station devices that are authorized to operate in the WVAN, wherein the domain manager is to further sign the security list having therein a strictly increasing sequence number issued by the domain manager to indicate a version of the security list maintained by the domain manager; and
an antenna for wireless transmitting of high-definition video and audio signals to the one or more station devices in the WVAN.

18. The WVAN of claim 17 wherein a new station device cannot be authorized to join the WVAN when the coordinator device is not participating in the WVAN.

19. The WVAN of claim 18 wherein a previously authorized station device may rejoin the WVAN whether or not the coordinator device is participating in the WVAN.

20. The WVAN of claim 17:
- wherein the security list of station devices that are authorized to operate in the WVAN lists each of the one or more station devices that are authorized stations devices; and
- wherein each authorized station device includes an authentic copy of the public key of the domain manager, the address of the domain manager and a latest version of the security list of authorized station devices.

21. The WVAN of claim 20 wherein the security list of authorized station devices includes a strictly increasing secure packet counter used to prevent the replay of old messages.

22. The WVAN of claim 20 wherein a first station device may receive the security list of authorized station devices from a second station device when the domain manager is not participating in the WVAN.

* * * * *

UNITED STATES PATENT AND TRADEMARK OFFICE
CERTIFICATE OF CORRECTION

PATENT NO. : 8,831,225 B2
APPLICATION NO. : 12/079133
DATED : September 9, 2014
INVENTOR(S) : James P. K. Gilb It is certified that error appears in the above-identified patent and that said Letters Patent is hereby corrected as shown below:

In the Claims

Column 7, claim 7, line 22, after "list" delete "of";
Column 7, claim 7, line 23, before "includes" delete "authorized station devices".

Signed and Sealed this
Twenty-ninth Day of September, 2015

Michelle K. Lee
*Director of the United States Patent and Trademark Office*